(12) United States Patent
Davis

(10) Patent No.: US 12,397,512 B2
(45) Date of Patent: Aug. 26, 2025

(54) FORMING DUCT STRUCTURE WITH OVERBRAIDED WOVEN FIBER SLEEVE

(71) Applicant: Rohr, Inc., Chula Vista, CA (US)

(72) Inventor: Jennifer Davis, Carlsbad, CA (US)

(73) Assignee: Rohr, Inc., Chula Vista, CA (US)

( * ) Notice: Subject to any disclaimer, the term of this patent is extended or adjusted under 35 U.S.C. 154(b) by 200 days.

(21) Appl. No.: 18/095,327

(22) Filed: Jan. 10, 2023

(65) Prior Publication Data

US 2024/0227321 A1    Jul. 11, 2024

(51) Int. Cl.
| | |
|---|---|
| *B29C 70/30* | (2006.01) |
| *B29C 70/24* | (2006.01) |
| *B29L 31/00* | (2006.01) |
| *F02C 7/04* | (2006.01) |

(52) U.S. Cl.
CPC ............. *B29C 70/24* (2013.01); *B29C 70/30* (2013.01); *B29L 2031/749* (2013.01); *F02C 7/04* (2013.01); *F05D 2230/31* (2013.01)

(58) Field of Classification Search
CPC ...... B29C 70/446; B29C 70/32; B29C 70/462
See application file for complete search history.

(56) References Cited

U.S. PATENT DOCUMENTS

| | | | | |
|---|---|---|---|---|
| 2,751,237 | A * | 6/1956 | Conley | .............. B29C 53/76 |
| | | | | 285/133.4 |
| 8,263,200 | B2 | 9/2012 | Barber | |
| 8,951,375 | B2 | 2/2015 | Havens | |
| 9,073,240 | B2 | 7/2015 | Huelskamp | |
| 9,279,531 | B2 | 3/2016 | Parkin | |
| 9,469,390 | B2 | 10/2016 | Kowal | |
| 11,091,847 | B2 | 8/2021 | Yang | |
| 2016/0271888 | A1 | 9/2016 | Mihara | |
| 2020/0049282 | A1* | 2/2020 | Giannakopoulos | ... B29C 70/222 |

FOREIGN PATENT DOCUMENTS

| | | | | |
|---|---|---|---|---|
| DE | 2443824 C2 | 10/1976 | | |
| EP | 0243751 | * | 8/1990 | ............. B29C 67/14 |

OTHER PUBLICATIONS

Robertson, I.D. et al., Rapid energy-efficient manufacturing of polymers and composites via frontal polymerization, Nature, vol. 557 (May 10, 2018), pp. 223-227. (Year: 2018).*
EP Search Report for EP Patent Application No. 24151131.0 dated Jun. 6, 2024.

* cited by examiner

*Primary Examiner* — Matthew J Daniels
(74) *Attorney, Agent, or Firm* — Getz Balich LLC

(57) ABSTRACT

A method is provided for manufacturing. During this method, a first woven fiber sleeve is disposed over a first mandrel to provide a first overbraided mandrel. The first woven fiber sleeve is wrapped circumferentially around the first mandrel. An opening is formed through a side of the first woven fiber sleeve. A second woven fiber sleeve is disposed over a second mandrel to provide a second overbraided mandrel. The second woven fiber sleeve is wrapped circumferentially around the second mandrel. The second overbraided mandrel is arranged with the first overbraided mandrel. The second woven fiber sleeve engages the side of the first woven fiber sleeve. A second overbraid first end is disposed at and extends circumferentially around the opening. A polymer material is disposed with the first woven fiber sleeve and the second woven fiber sleeve to provide a duct structure.

16 Claims, 17 Drawing Sheets

FORMING DUCT STRUCTURE WITH OVERBRAIDED WOVEN FIBER SLEEVE

BACKGROUND

1. Technical Field

This disclosure relates generally to manufacturing a fiber-reinforced composite duct structure.

2. Background Information

An aircraft propulsion system may include a duct structure for delivering air to an engine such as a turboprop gas turbine engine. The duct structure may also include a bypass duct. Various types of duct structures and methods for forming those duct structures are known in the art. While these known duct structures and methods for forming duct structures have various benefits, there is still room in the art for improvement.

SUMMARY OF THE DISCLOSURE

According to an aspect of the present disclosure, a method is provided for manufacturing. During this method, a first woven fiber sleeve is disposed over a first mandrel to provide a first overbraided mandrel. The first woven fiber sleeve is wrapped circumferentially around the first mandrel. The first woven fiber sleeve extends longitudinally along the first mandrel between a first overbraid first end and a first overbraid second end. An opening is formed through a side of the first woven fiber sleeve longitudinally between the first overbraid first end and the first overbraid second end. A second woven fiber sleeve is disposed over a second mandrel to provide a second overbraided mandrel. The second woven fiber sleeve is wrapped circumferentially around the second mandrel. The second woven fiber sleeve extends longitudinally along the second mandrel between a second overbraid first end and a second overbraid second end. The second overbraided mandrel is arranged with the first overbraided mandrel. The second woven fiber sleeve engages the side of the first woven fiber sleeve. The second overbraid first end is disposed at and extends circumferentially around the opening. A polymer material is disposed with the first woven fiber sleeve and the second woven fiber sleeve to provide a duct structure.

According to another aspect of the present disclosure, another method is provided for manufacturing. During this method, a first woven fiber sleeve is disposed over a first mandrel to provide a first overbraided mandrel. The first woven fiber sleeve is wrapped circumferentially around the first mandrel. The first woven fiber sleeve extends longitudinally along the first mandrel between a first overbraid first end and a first overbraid second end. An opening is formed through a side of the first woven fiber sleeve longitudinally between the first overbraid first end and the first overbraid second end. A second woven fiber sleeve is over a second mandrel to provide a second overbraided mandrel. The second woven fiber sleeve is wrapped circumferentially around the second mandrel. The second woven fiber sleeve extends longitudinally along the second mandrel between a second overbraid first end and a second overbraid second end. The second overbraided mandrel is inserted through the opening and into an aperture in the first mandrel. The second woven fiber sleeve engages the side of the first woven fiber sleeve. The the second overbraid first end is disposed at the opening. A polymer material is disposed with the first woven fiber sleeve and the second woven fiber sleeve to provide a duct structure.

According to still another aspect of the present disclosure, another method is provided for manufacturing. During this method, a first woven fiber sleeve is disposed over a first mandrel to provide a first overbraided mandrel. The first woven fiber sleeve is wrapped circumferentially around the first mandrel. The first woven fiber sleeve extends longitudinally along the first mandrel between a first overbraid first end and a first overbraid second end. An opening is formed through a side of the first woven fiber sleeve longitudinally between the first overbraid first end and the first overbraid second end. A thermoset material is disposed with the first woven fiber sleeve to provide a first duct section. A second woven fiber sleeve is disposed over a second mandrel to provide a second overbraided mandrel. The second woven fiber sleeve is wrapped circumferentially around the second mandrel. The second woven fiber sleeve extends longitudinally along the second mandrel between a second overbraid first end and a second overbraid second end. The thermoset material is disposed with the second woven fiber sleeve to provide a second duct section. The second duct section is arranged with the first duct section. The second woven fiber sleeve of the second duct section engages the side of the first woven fiber sleeve of the first duct section. The second overbraid first end is disposed at and extends circumferentially around the opening. A duct structure is formed by attaching the second duct section to the first duct section.

The thermoset material of the second duct section may be co-cured with the thermoset material of the first duct section during the attaching.

The second duct section may be mechanically fastened to the first duct section during the attaching.

The duct structure may include an inlet, a first outlet and a second outlet. The duct structure may fluidly couple and branch out from the inlet to the first outlet and the second outlet.

The first woven fiber sleeve may form the inlet at the first overbraid first end. The first woven fiber sleeve may form the first outlet at the first overbraid second end. The second woven fiber sleeve may form the second outlet at the second overbraid second end.

The second woven fiber sleeve of the second overbraided mandrel may include a base section and a mount section. The base section may be wrapped circumferentially around the second mandrel. The base section may extend longitudinally along the second mandrel between the second overbraid first end and the second overbraid second end. The mount section may be disposed at the second overbraid first end and may project out from the base section.

The mount section may be abutted against the side of the first woven fiber sleeve during the arranging of the second overbraided mandrel.

The mount section may form an annular flange around the opening.

The method may also include: disposing a third woven fiber sleeve over a third mandrel to provide a third overbraided mandrel, the third woven fiber sleeve wrapped circumferentially around the third mandrel, and the third woven fiber sleeve extending longitudinally along the third mandrel between a third overbraid first end and a third overbraid second end; and arranging the third overbraided mandrel with the first overbraided mandrel, the third woven fiber sleeve engaging the side of the first woven fiber sleeve, and the third overbraid first end disposed at a second opening in the side of the first woven fiber sleeve longitudinally between the first overbraid first end and the first overbraid second end; the disposing of the polymer material further including disposing the polymer material with the third woven fiber sleeve to provide the duct structure.

The arranging of the third overbraided mandrel may include inserting the third overbraided mandrel through the second opening and into an aperture in the first mandrel.

The third woven fiber sleeve of the third overbraided mandrel may include a base section and a mount section. The base section may be wrapped circumferentially around the third mandrel. The base section may extend longitudinally along the third mandrel between the third overbraid first end and the third overbraid second end. The mount section may be disposed at the third overbraid first end and may project out from the base section.

The mount section may be abutted against the side of the first woven fiber sleeve during the arranging of the third overbraided mandrel.

The mount section may form an annular flange around the second opening.

The method may also include: arranging one or more electric heating elements with at least one of the first woven fiber sleeve or the second woven fiber sleeve; the one or more electric heating elements configured for an anti-icing system for the duct structure.

The method may also include: providing an acoustic structure for the duct structure; the acoustic structure including a perforated face skin, a back skin and a cellular core between and connected to the perforated face skin and the back skin; and the perforated face skin including a portion of the first woven fiber sleeve.

The polymer material may be configured from or otherwise include thermoset material.

The disposing of the polymer material may include: infusing the polymer material into the first woven fiber sleeve and the second woven fiber sleeve; and curing the polymer material to provide the duct structure.

The duct structure may be configured for an aircraft propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for manufacturing a duct structure from fiber-reinforced composite material. This duct structure may be configured for an aircraft such as an airplane or another manned or unmanned aerial vehicle. The duct structure, for example, may be configured for a propulsion system of the aircraft. The present disclosure, however, is not limited to such an exemplary aircraft application. The duct structure, for example, may alternatively be configured for use in a part or system of the aircraft outside of (or in combination with) the aircraft propulsion system. Furthermore, the duct structure is not limited to aircraft applications in general. The duct structure, for example, may be configured for any application which would benefit from use of a (e.g., monolithic) fiber-reinforced composite duct structure manufactured as described below. However, for ease of description, the duct structure may be described with respect to an aircraft propulsion system.

Figure 1:
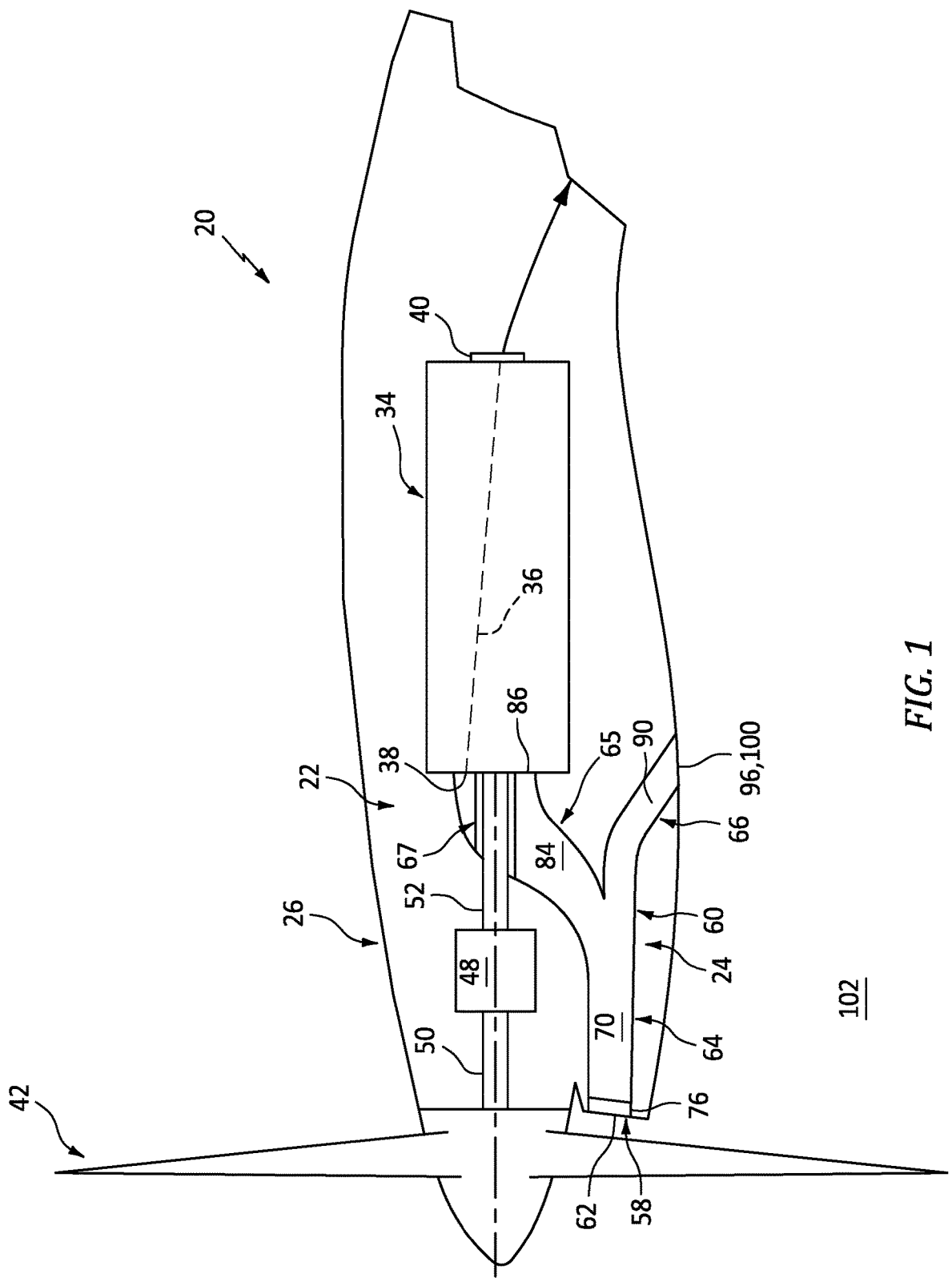
FIG. 1 is a side schematic illustration of an aircraft propulsion system.

FIG. 1 illustrates an exemplary aircraft propulsion system 20. This aircraft propulsion system 20 includes an engine 22 and a duct assembly 24. The aircraft propulsion system 20 also include a nacelle 26 configured to at least partially (or completely) house and provide an aerodynamic cover for the engine 22 and/or the duct assembly 24.

Figure 2:
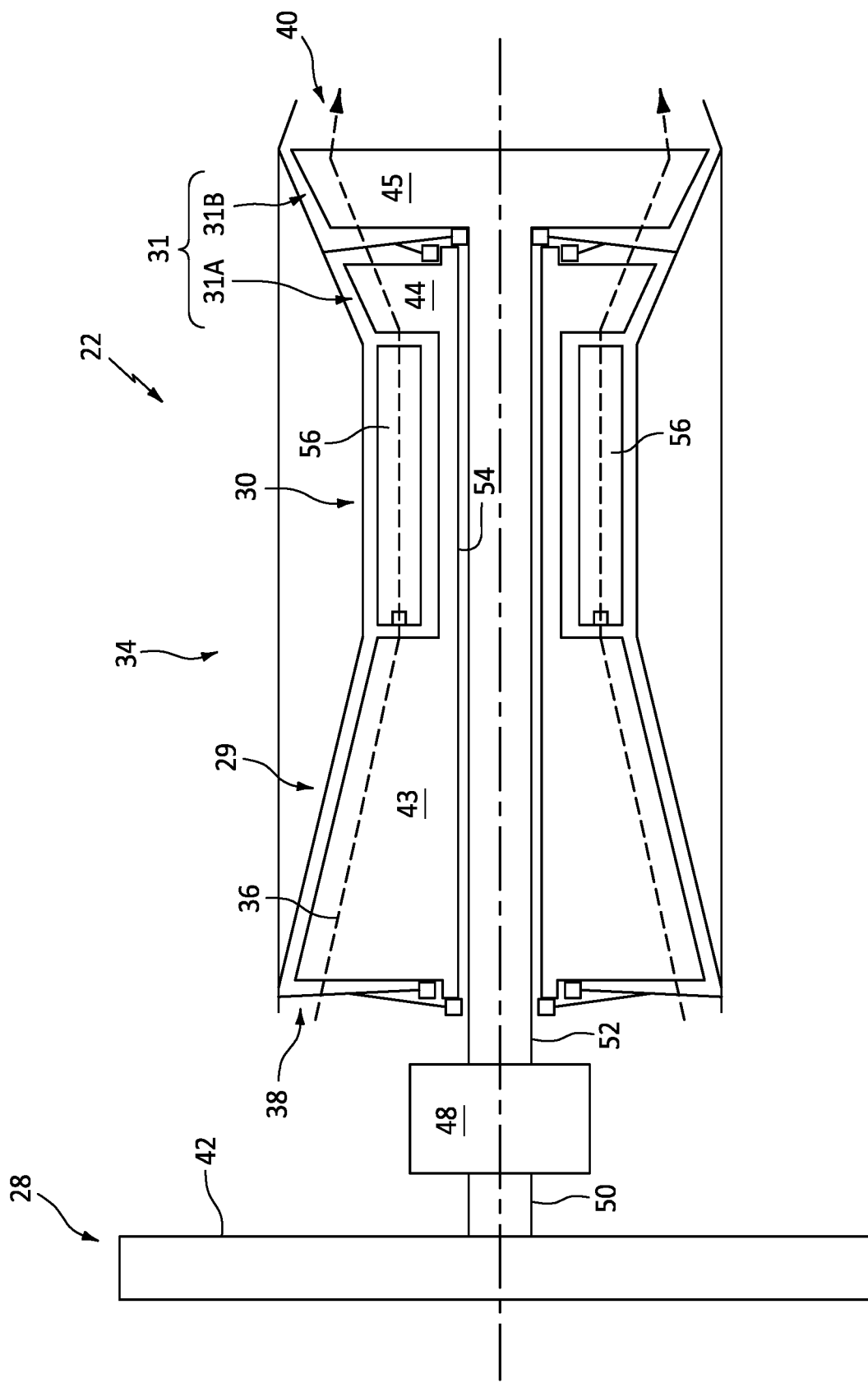
FIG. 2 is a side schematic illustration of an engine for the aircraft propulsion system.

Referring to FIG. 2, the engine 22 may be configured as an open rotor gas turbine engine such as a turboprop gas turbine engine. The engine 22 of FIG. 2, for example, includes a propeller section 28, a compressor section 29, a combustor section 30 and a turbine section 31. The turbine section 31 may include a high pressure turbine (HPT) section 31A and a low pressure turbine (LPT) section 31B; e.g., a power turbine section. A core 34 of the engine 22 includes the compressor section 29, the combustor section 30, the HPT section 31A and the LPT section 31B.

The engine sections 29-31B are arranged sequentially along a core flowpath 36 within the engine core 34. This core flowpath 36 extends within the engine core 34 from an upstream airflow inlet 38 into the engine core 34 to a downstream combustion products exhaust 40 from the engine core 34. Here, the airflow inlet 38 is also an airflow inlet into the engine 22 and the exhaust 40 is also a combustion products exhaust from the engine 22; however, the present disclosure is not limited to such an exemplary arrangement.

Each of the engine sections 28, 29, 31A and 31B includes a respective bladed rotor 42-45. Each of these bladed rotors 42-45 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The propeller rotor 42 is connected to a geartrain 48 through a propeller shaft 50. The geartrain 48 is connected to and driven by the LPT rotor 45 through a low speed shaft 52. The compressor rotor 43 is connected to and driven by the HPT rotor 44 through a high speed shaft 54.

During engine operation, air enters the engine core 34 through the airflow inlet 38 and is directed into the core flowpath 36. The air within the core flowpath 36 may be referred to as "core air". This core air is compressed by the compressor rotor 43 and directed into a combustion chamber 56 of a combustor in the combustor section 30. Fuel is injected into the combustion chamber 56 through one or more fuel injectors and mixed with the compressor core air to provide a fuel-air mixture. This fuel-air mixture is ignited and combustion products thereof flow through and sequentially cause the HPT rotor 44 and the LPT rotor 45 to rotate. The rotation of the HPT rotor 44 drives rotation of the compressor rotor 43 and, thus, compression of the air received from the airflow inlet 38. The rotation of the LPT rotor 45 drives rotation of the propeller rotor 42. The rotation of the propeller rotor 42 generates forward aircraft thrust by propelling additional air (e.g., outside of the engine core 34 and the nacelle 26 of FIG. 1) in an aft direction.

The engine 22 is described above as the turboprop gas turbine engine for ease of description. The present disclosure, however, is not limited to such an exemplary engine. The engine 22, for example, may alternatively be configured as another type of open rotor gas turbine engine, or alternatively a ducted gas turbine engine such as a turbofan or turbojet gas turbine engine. Furthermore, it is also contemplated the engine core 34 may be replaced with another engine powerplant such as, but not limited to, a reciprocating piston engine, a rotary engine or another type of internal combustion engine.

Referring to FIG. 1, the duct assembly 24 includes an inlet nose lip 58 of the nacelle 26 and the fiber-reinforced composite duct structure 60. The nose lip 58 is configured to form an airflow inlet 62 into the aircraft propulsion system 20 and its duct assembly 24. The nose lip 58 of FIG. 1 is arranged at (e.g., on, adjacent or proximate) a forward end of the nacelle 26. This nose lip 58 may be vertically below (e.g., relative to gravity) and aft/downstream of the propeller rotor hub. The nose lip 58 of the present disclosure, however, is not limited to such an exemplary relative position to the propeller rotor 42.

Figure 3:
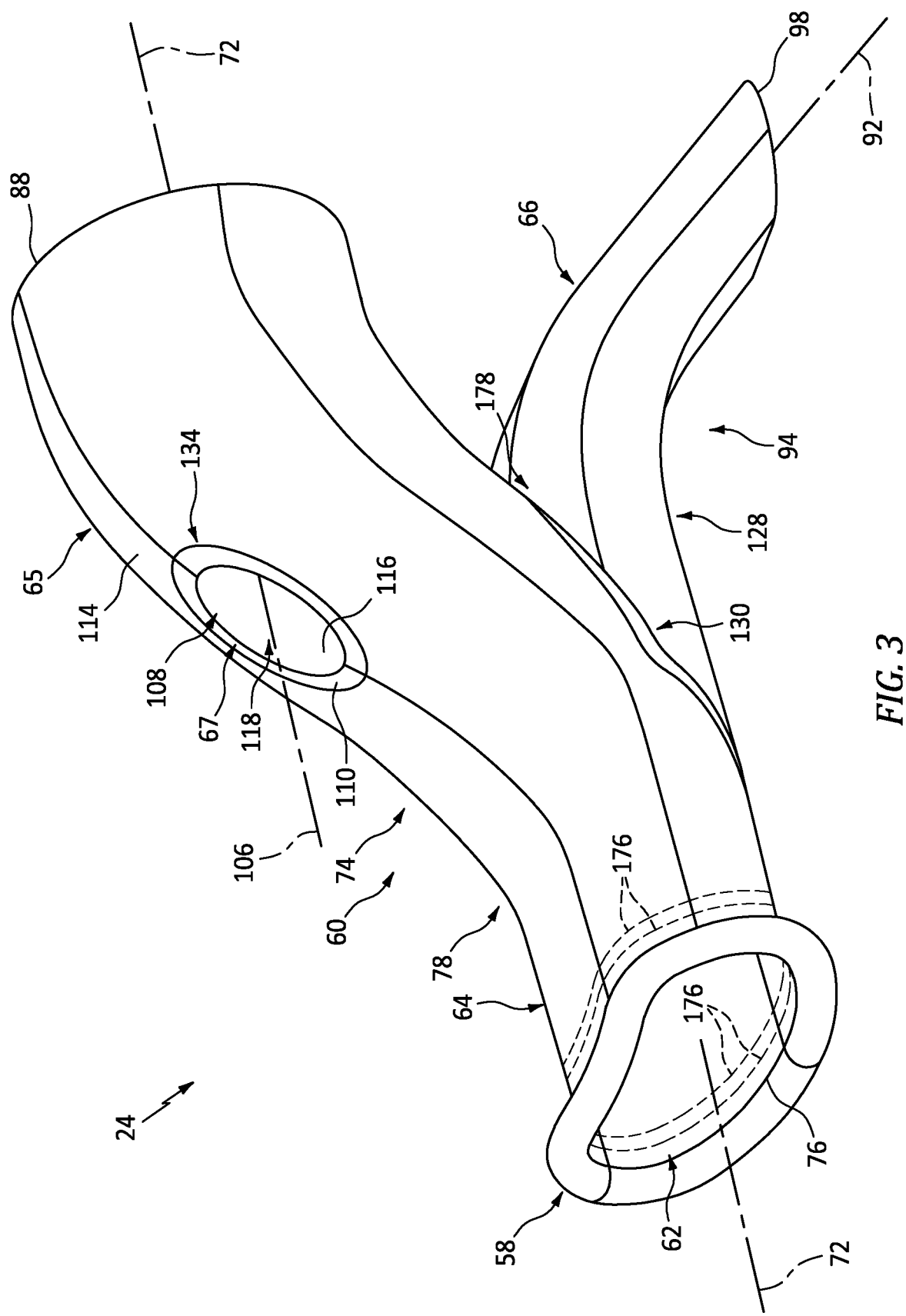
FIG. 3 is a perspective illustration of a duct assembly for the aircraft propulsion system.
Figure 4:
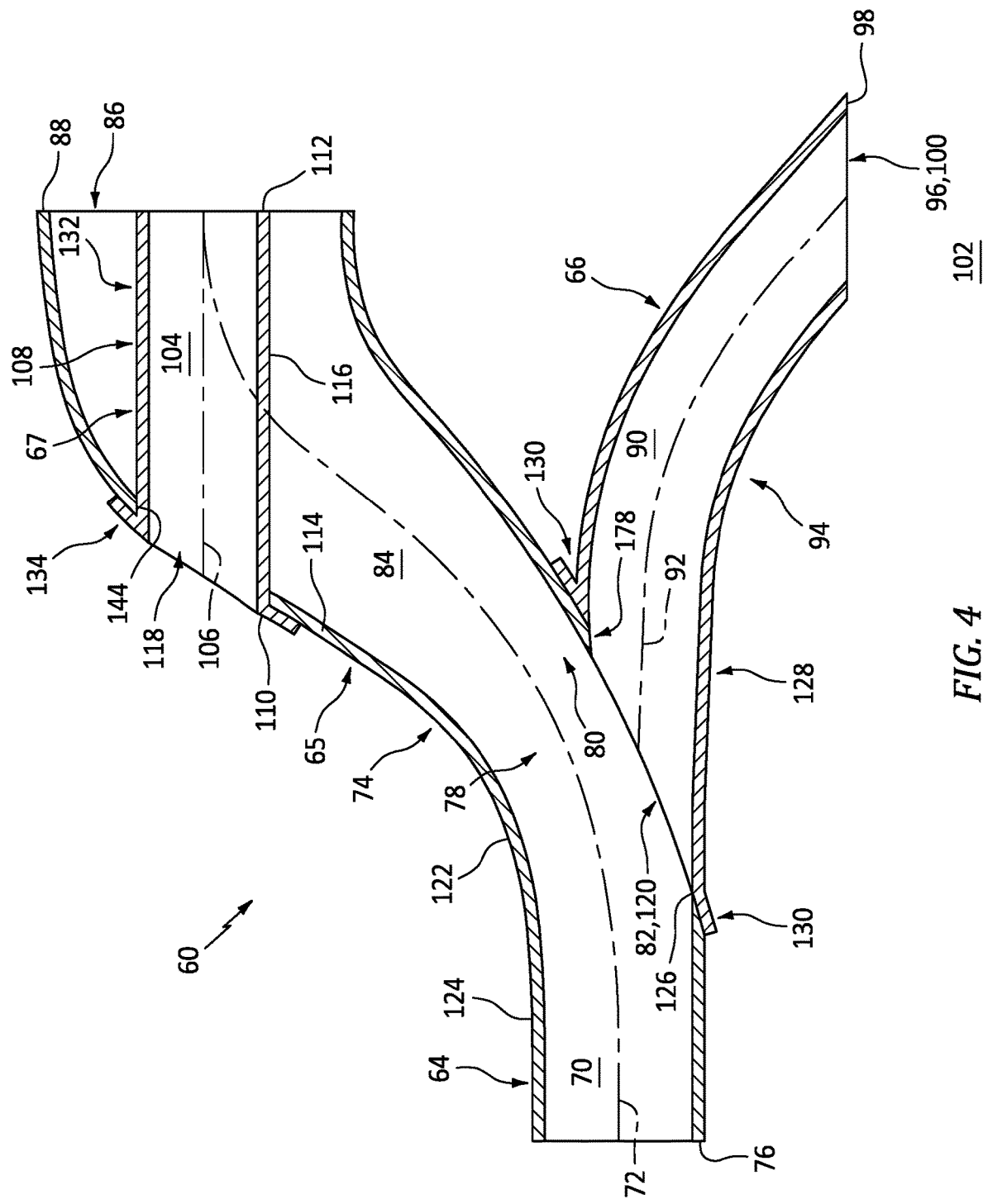
FIG. 4 is a sectional illustration of a duct structure.

Referring to FIGS. 3 and 4, the duct structure 60 includes a plurality of ducts such as, but not limited to, an inlet duct 64, an engine duct 65, a bypass duct 66 and a shaft duct 67. This duct structure 60 may be configured as a monolithic body. The duct structure members (e.g., the ducts 64-67), for example, may be molded and/or otherwise formed integral together to configure the duct structure 60 as a single, unitary body. By contrast, a non-monolithic body may include a plurality of bodies which are discretely formed and subsequently (e.g., mechanically) fastened or welded to one another. By forming the duct structure 60 as the monolithic body, an overall weight and/or complexity of the duct structure 60 may be reduced. The present disclosure, however, is not limited to such an exemplary monolithic arrangement as described below in further detail.

The duct structure 60 may be constructed from or otherwise include a polymer material. This polymer material is structurally reinforced with fiber reinforcement. The fiber reinforcement, for example, may be embedded within a matrix of the polymer material. The polymer material may be a thermoset such as, but not limited to, epoxy or toughened epoxy. However, it is contemplated the polymer material may alternatively be a thermoplastic such as, but not limited to, polyether ether ketone (PEEK), polyaryletherketone (PAEK), polyether ketone ketone (PEKK) or polyphenylene sulfide (PPS). However, for ease of description, the polymer material may be described below as the thermoset. The fiber reinforcement may be or otherwise include fiberglass fibers, carbon fibers, aramid (e.g., Kevlar®) fibers, or some combination therewith. The present disclosure, however, is not limited to the foregoing exemplary duct structure materials.

The inlet duct 64 of FIG. 4 has an internal flowpath 70; e.g., a bore. The inlet duct 64 and its flowpath 70 extend longitudinally along a longitudinal centerline 72 of a base duct section 74 of the duct structure 60 and its duct structure members (e.g., the ducts 64 and 65) from a forward, upstream end 76 of the duct structure 60 to a transition 78 to (e.g., an interface with) the engine duct 65 and the bypass duct 66. At the structure upstream end 76 of FIG. 1, the inlet duct 64 is attached (e.g., mechanically fastened or bonded) to the nose lip 58. The inlet duct flowpath 70 is also fluidly coupled with the airflow inlet 62. At the inter-duct transition 78 of FIG. 4, the inlet duct 64 is connected to (e.g., formed integral with or otherwise attached to) the engine duct 65 and the bypass duct 66. The inlet duct flowpath 70 is also fluidly coupled with (e.g., in parallel) an inlet 80 of and into the engine duct 65 and an inlet 82 of and into the bypass duct 66. With this arrangement, the engine duct 65 and the bypass duct 66 branch off from and are fluidly fed by the inlet duct 64.

Figure 5:
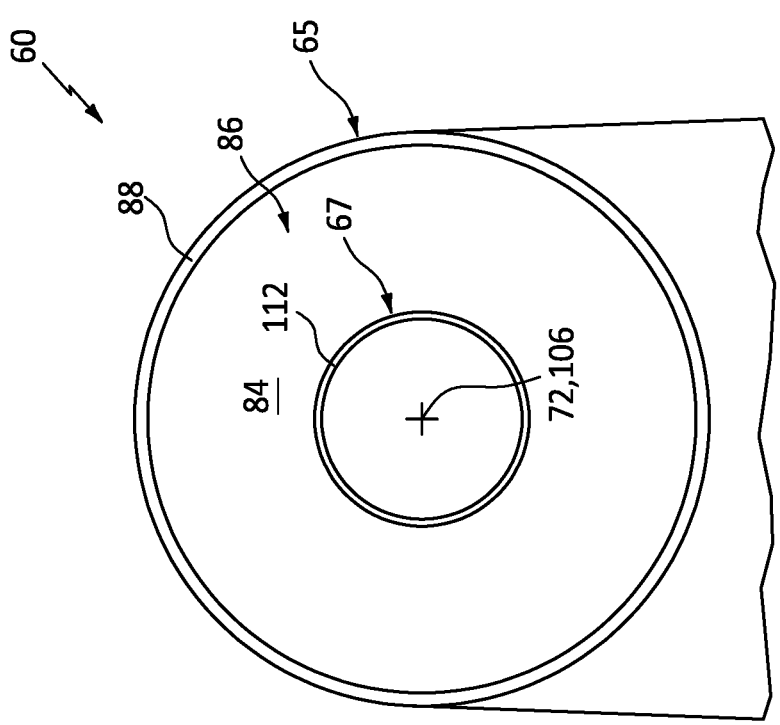
FIG. 5 is a partial illustration of the duct structure at an outlet from an engine duct flowpath.

The engine duct 65 has an internal flowpath 84; e.g., a bore. The engine duct 65 and its flowpath 84 extend longitudinally along the longitudinal centerline 72 from the engine duct inlet 80 to an outlet 86 of and from the engine duct 65. This engine duct outlet 86 is disposed at an aft, downstream end 88 of the engine duct 65. The engine duct outlet 86 is configured to fluidly couple the engine duct 65 and its flowpath 84 to the engine 22 and its airflow inlet 38; see FIG. 1. Referring to FIG. 5, the engine duct outlet 86 may be an annular orifice. The engine duct outlet 86 of FIG. 5, for example, extends radially between and to an exterior surface of the shaft duct 67 and an interior surface of the engine duct 65. The engine duct outlet 86 of FIG. 5 also extends within the duct structure 60 and its engine duct 65 circumferentially about (e.g., completely around) the longitudinal centerline 72. The engine duct outlet 86 may thereby circumscribe the shaft duct 67, and the engine duct 65 may circumscribe the engine duct outlet 86. In other embodiments, however, it is contemplated the engine duct outlet 86 may be formed by and radially between the engine duct 65 and another duct where, for example, the shaft duct 67 is recessed from the engine duct downstream end 88 and the other duct provides an extension for the shaft duct 67.

Referring to FIG. 4, after branching off from the inlet duct 64, the engine duct 65 may turn away from the bypass duct 66; e.g., vertically upwards and then horizontal in FIG. 4. The engine duct 65 and its longitudinal centerline 72 of FIG. 4, for example, follow a non-straight (e.g., a curved, a wavy, a splined, etc.) trajectory from the inlet duct 64 and to the engine duct outlet 86. With this arrangement, a forward, upstream portion of the engine duct 65 and its flowpath 84 may be angularly offset from and downstream of the inlet duct 64 and its flowpath 70. The present disclosure, however, is not limited to such an exemplary geometry.

The bypass duct 66 has an internal flowpath 90; e.g., a bore. The bypass duct 66 and its flowpath 90 extend longitudinally along a longitudinal centerline 92 of a bypass duct section 94 of the duct structure 60 and its bypass duct 66 from the bypass duct inlet 82 to an outlet 96 of and from the bypass duct 66. This bypass duct outlet 96 is disposed at an aft, downstream end 98 of the bypass duct 66. Referring to FIG. 1, the bypass duct outlet 96 may be configured as a bypass exhaust 100 from the duct structure 60 into an environment 102 external to the aircraft propulsion system 20 and its nacelle 26; e.g., an external environment, an ambient environment, etc.

Referring to FIG. 4, after branching off from the inlet duct 64, the bypass duct 66 may turn away from the engine duct 65; e.g., horizontally and then vertically downwards in FIG. 4. The bypass duct 66 and its longitudinal centerline 92 of FIG. 4, for example, follow a non-straight (e.g., a curved, a wavy, a splined, etc.) trajectory away from the inlet duct 64 and to the bypass duct outlet 96/the bypass exhaust 100. With this arrangement, a forward, upstream portion of the bypass duct 66 and its flowpath 90 may be substantially aligned in a straight line with and downstream of the inlet duct 64 and its flowpath 70. The present disclosure, however, is not limited to such an exemplary geometry.

Figure 6A:
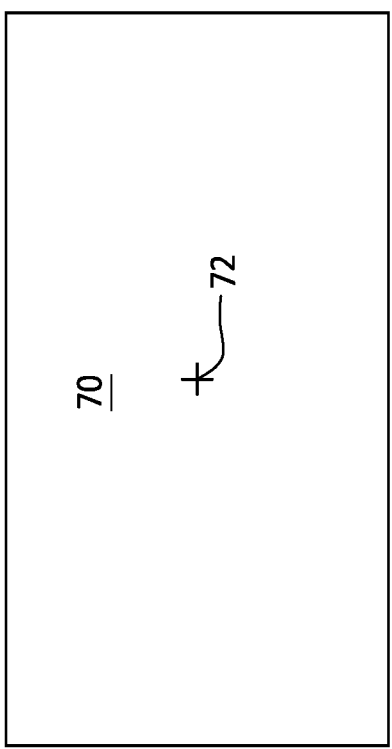
FIGS. 6A-C are schematic cross-sectional illustrations of various ducts of the duct structure.
Figure 6B:
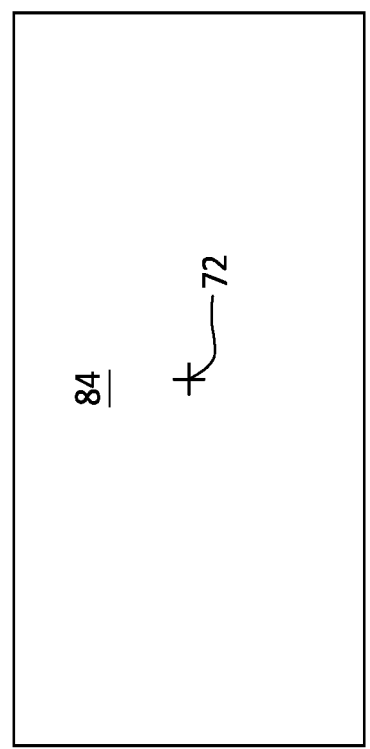
Figure 6C:
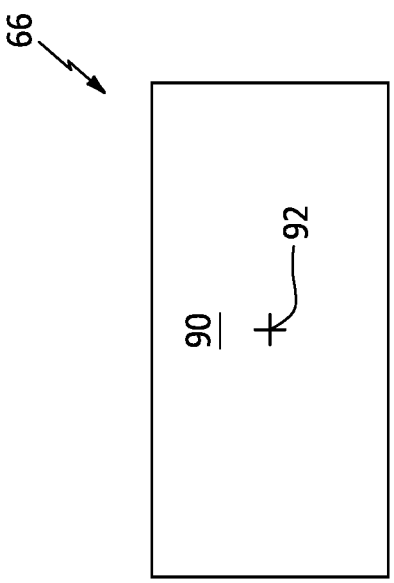

At the inter-duct transition 78, referring to FIG. 6A-C, each of the duct flowpaths 70, 84, 90 has a cross-sectional area (schematically shown). The inlet duct cross-sectional area may be sized greater than the engine duct cross-sectional area and the bypass duct cross-sectional area. The inlet duct cross-sectional area, for example, may be exactly equal to or approximately equal to (e.g., within +/−2% of) a sum of the engine duct cross-sectional area and the bypass duct cross-sectional area. The engine duct cross-sectional area, however, may be sized greater than the bypass duct cross-sectional area. The engine duct cross-sectional area, for example, may be between one and one-half times (1.5×) and five or ten times (5×, 10×) the bypass duct cross-sectional area. The inlet duct 64 of FIG. 4 may thereby be configured to direct a majority of fluid received from the nose lip 58 and its airflow inlet 62 (see FIG. 1) into the engine duct 65 and its flowpath 84 over the bypass duct 66. The present disclosure, however, is not limited to the foregoing exemplary dimensional relationships.

The shaft duct 67 has an internal bore 104. The shaft duct 67 and its internal bore 104 extend longitudinally along a longitudinal centerline 106 (e.g., a centerline axis) a shaft duct section 108 of the duct structure 60 and its shaft duct 67 from a forward, upstream end 110 of the shaft duct 67 to an aft, downstream end 112 of the shaft duct 67. The shaft duct upstream end 110 is disposed at a sidewall 114 of the engine duct 65. At this shaft duct upstream end 110, a sidewall 116 of the shaft duct 67 is connected to the engine duct sidewall 114 and extends circumferentially about (e.g., completely around) a shaft opening 118 through the engine duct sidewall 114. The shaft duct downstream end 112 is disposed at the engine duct downstream end 88. With this arrangement, the internal bore 104 forms an open passageway through the shaft duct 67 as well as through the duct structure 60. This open passageway/the internal bore 104 is configured to receive a shaft for the aircraft propulsion system 20. The low speed shaft 52 of FIG. 1, for example, may extend axially through the open passageway/the internal bore of the shaft duct 67. In other embodiments, however, it is contemplated the propeller shaft 50 (or another shaft) may alternatively extend axially through the open passageway/the internal bore of the shaft duct 67. With this arrangement, the duct structure 60 may direct air into an axial end of the engine core 34 without requiring offsetting of the propeller shaft 50, etc.

With the foregoing configuration, the duct assembly 24 is configured to receive (e.g., ingest) ambient air through the nose lip 58 from external environment 102. The duct assembly 24 and its duct structure 60 are configured to direct some of the ambient air to the engine 22 and its airflow inlet 38 through the engine duct 65 to supply (e.g., all or at least some) of the core air. The duct assembly 24 is also configured to bypass some of the ambient air from the engine 22 and its core flowpath 36 into the bypass duct 66. More particularly, the duct assembly 24 may be configured such that any, substantially all or at least some debris (e.g., foreign object debris (FOD)) which enters the duct assembly 24 with the ambient air through the nose lip 58 is carried with the bypass air and exhausted from the aircraft propulsion system 20 through the bypass exhaust 100 without entering the engine 22 and its core flowpath 36. It is contemplated, of course, the bypass air flowing through the bypass duct 66 may also or alternatively be used for various other purposes.

Figure 7:
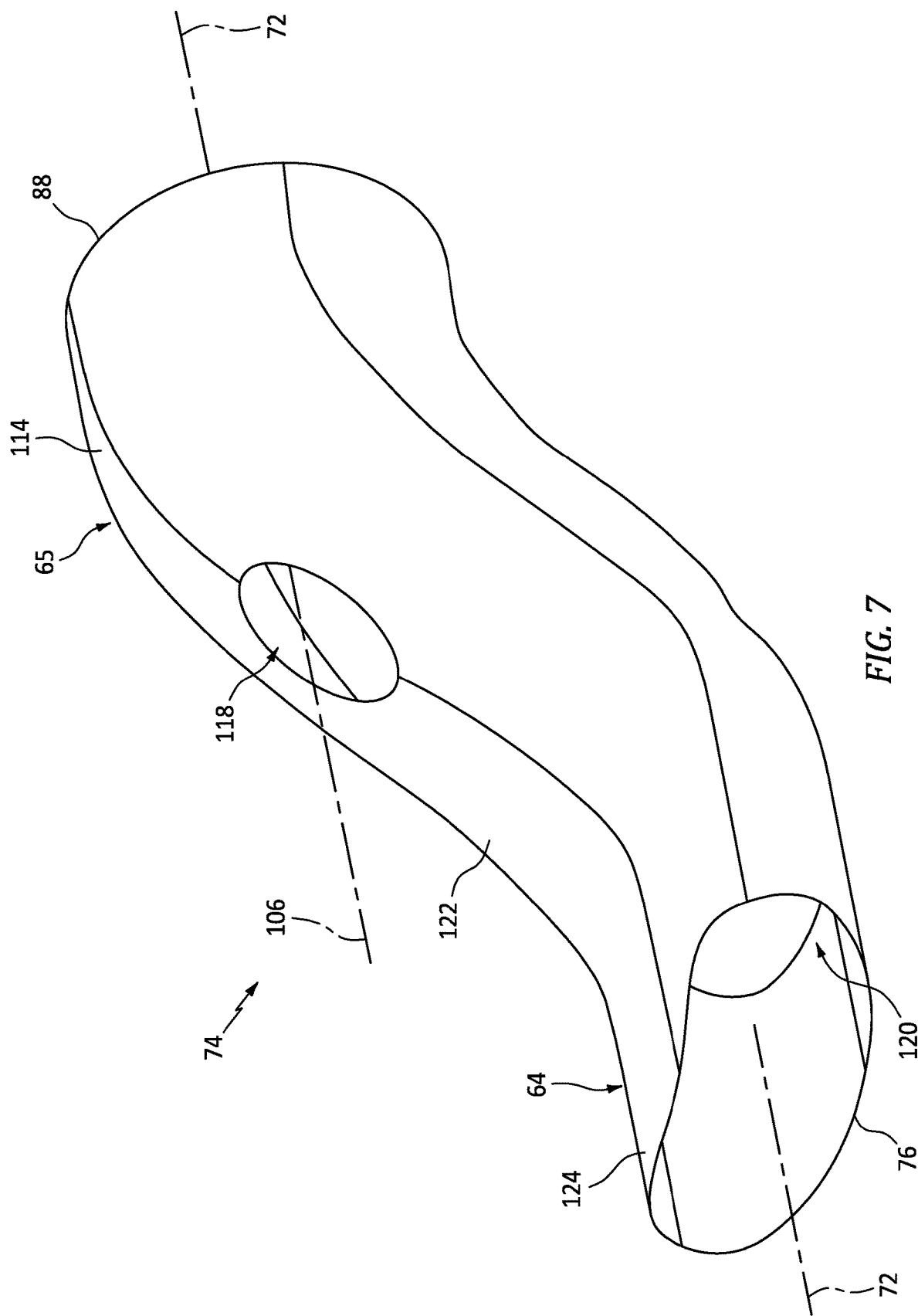
FIG. 7 is a perspective illustration of a base duct section of the duct structure.
Figure 8:
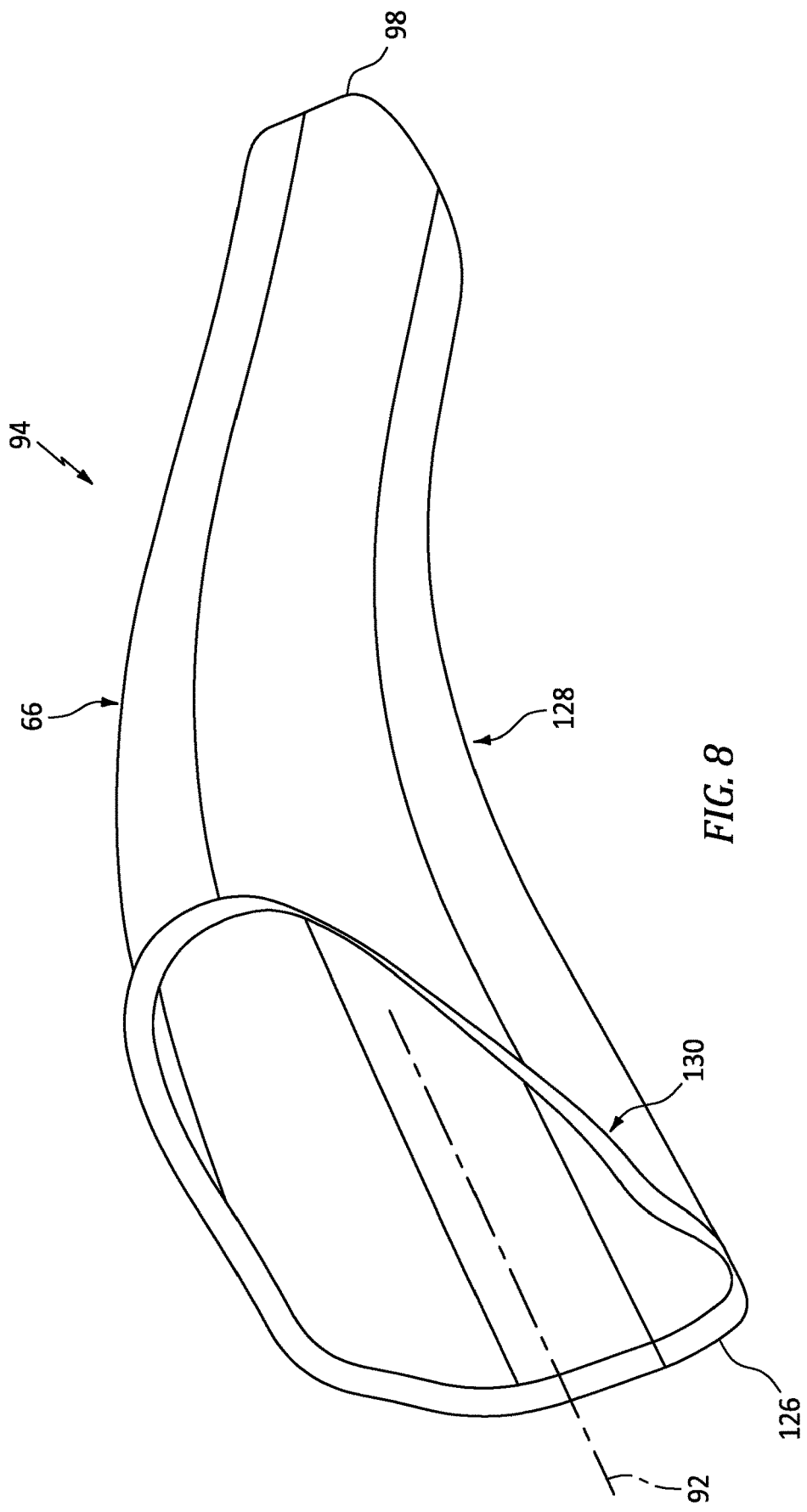
FIG. 8 is a perspective illustration of a bypass duct section of the duct structure.
Figure 9:
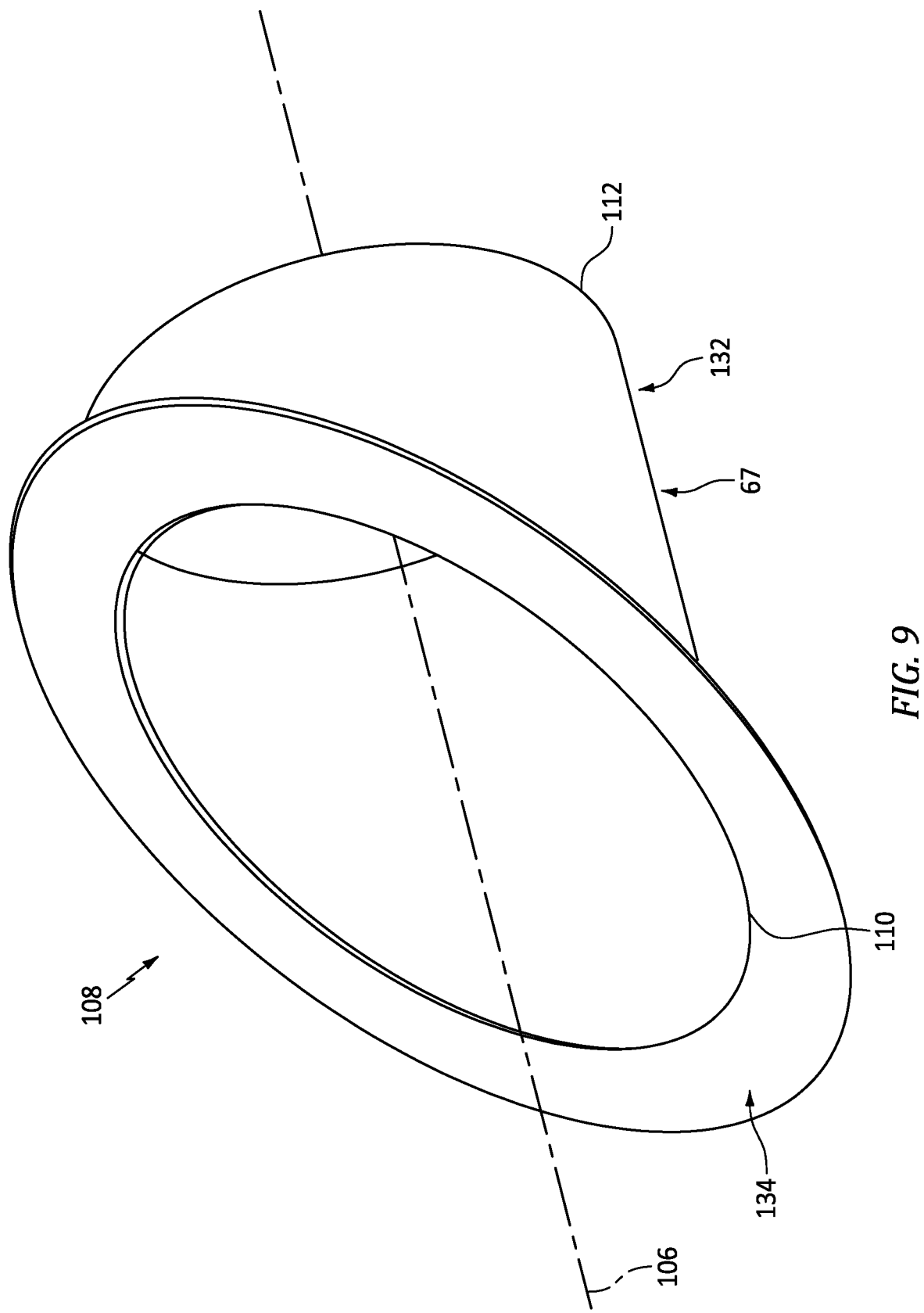
FIG. 9 is a perspective illustration of a shaft duct section of the duct structure.

The duct structure 60 of FIGS. 3 and 4 may be divided into a plurality of duct sections such as, but not limited to, the base duct section 74, the bypass duct section 94 and the shaft duct section 108. FIG. 7 illustrates the base duct section 74 without the other duct sections 94 and 108 for ease of illustration. FIG. 8 illustrates the bypass duct section 94 without the other duct sections 74 and 108 for ease of illustration. FIG. 9 illustrates the shaft duct section 108 without the other duct sections 74 and 94 for ease of illustration.

The base duct section 74 of FIG. 7 is configured as a tubular member (or body) of the duct structure 60. This base duct section 74 forms the inlet duct 64 and the engine duct 65. The base duct section 74 of FIG. 7, for example, extends longitudinally along the longitudinal centerline 72 from the structure upstream end 76 to the engine duct downstream end 88. The base duct section 74 includes a bypass opening 120 and the shaft opening 118. The bypass opening 120 is a port (e.g., an orifice) through a sidewall 122 of the base duct section 74; e.g., a sidewall 124 of the inlet duct 64. This bypass opening 120 may form the bypass duct inlet 82 (see FIG. 4). The shaft opening 118 is a port (e.g., an orifice) through the sidewall 122 of the base duct section 74; e.g., the sidewall 114 of the engine duct 65.

The bypass duct section 94 of FIG. 8 is configured as a tubular member (or body) of duct structure 60. This bypass duct section 94 forms the bypass duct 66. The bypass duct section 94 of FIG. 8, for example, extends longitudinally along the longitudinal centerline 92 from a forward, upstream end 126 to the bypass duct downstream end 98. The bypass duct section 94 of FIG. 8, in particular, includes a base section 128 (e.g., a tubular sidewall) and a mount section 130 (e.g., an annular flange). The base section 128 forms the bypass duct 66. The mount section 130 is disposed at the bypass duct upstream end 126. This mount section 130 projects out (e.g., radially outward) from the base section 128. The mount section 130 may extend circumferentially about the base section 128, thereby providing the mount section 130 with a full-hoop annular geometry. Referring to FIGS. 3 and 4, the mount section 130 is configured to engage (e.g., contact) and connect the bypass duct 66 to the base duct section 74 and its inlet duct 64. Here, the mount section 130 extends circumferentially about the bypass opening 120/the bypass duct inlet 82.

The shaft duct section 108 of FIG. 9 is configured as a tubular member (or body) of the duct structure 60. This shaft duct section 108 forms the shaft duct 67. The shaft duct section 108 of FIG. 9, for example, extends longitudinally along the longitudinal centerline 106 from the shaft duct upstream end 110 to the shaft duct downstream end 112. The shaft duct section 108 of FIG. 9, in particular, includes a base section 132 and a mount section 134; e.g., annular flange. The base section 132 forms the shaft duct 67. The mount section 134 is disposed at the shaft duct upstream end 110. This mount section 134 projects out (e.g., radially outward) from the base section 132. The mount section 134 may extend circumferentially about the base section 132, thereby providing the mount section 134 with a full-hoop annular geometry. Referring to FIGS. 3 and 4, the mount section 134 is configured to engage (e.g., contact) and connect the shaft duct 67 to the base duct section 74 and its engine duct 65. Here, the mount section 134 extends circumferentially around the shaft opening 118.

While the duct sections 74, 94 and 108 are shown in FIGS. 7-9 as separate bodies, two or all of these duct sections 74, 94 and 108 may be formed together as the monolithic body. In such embodiments, the mount sections 130, 134 may provide reinforced interfaces between the ducts 64 and 66, 65 and 67. Of course, in other embodiments, it is contemplated that one or more of these duct sections 74, 94 and 108 may each be formed as a discrete body and then attached (e.g., mechanically fastened or bonded to) the other respective duct section(s) 74, 94 and 108.

Figure 10:
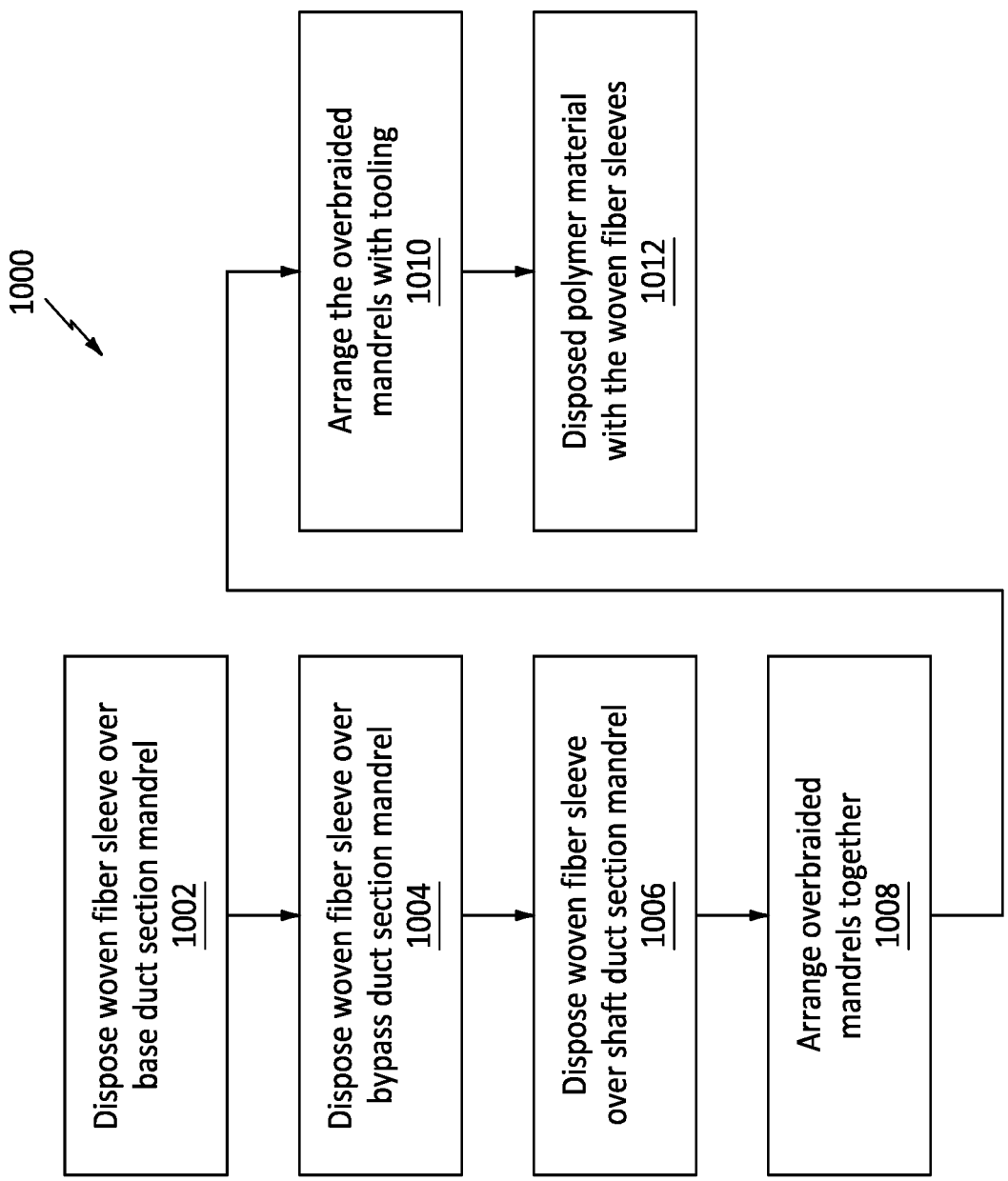
FIG. 10 is a flow diagram of a method for manufacturing a duct structure.

FIG. 10 is a flow diagram of a method 1000 for manufacturing a duct structure. For ease of description, the manufacturing method 1000 of FIG. 10 is described with reference to the duct structure 60 of FIGS. 1-9. The manufacturing method 1000 of the present disclosure, however, is not limited to manufacturing such an exemplary duct structure.

Figure 11:
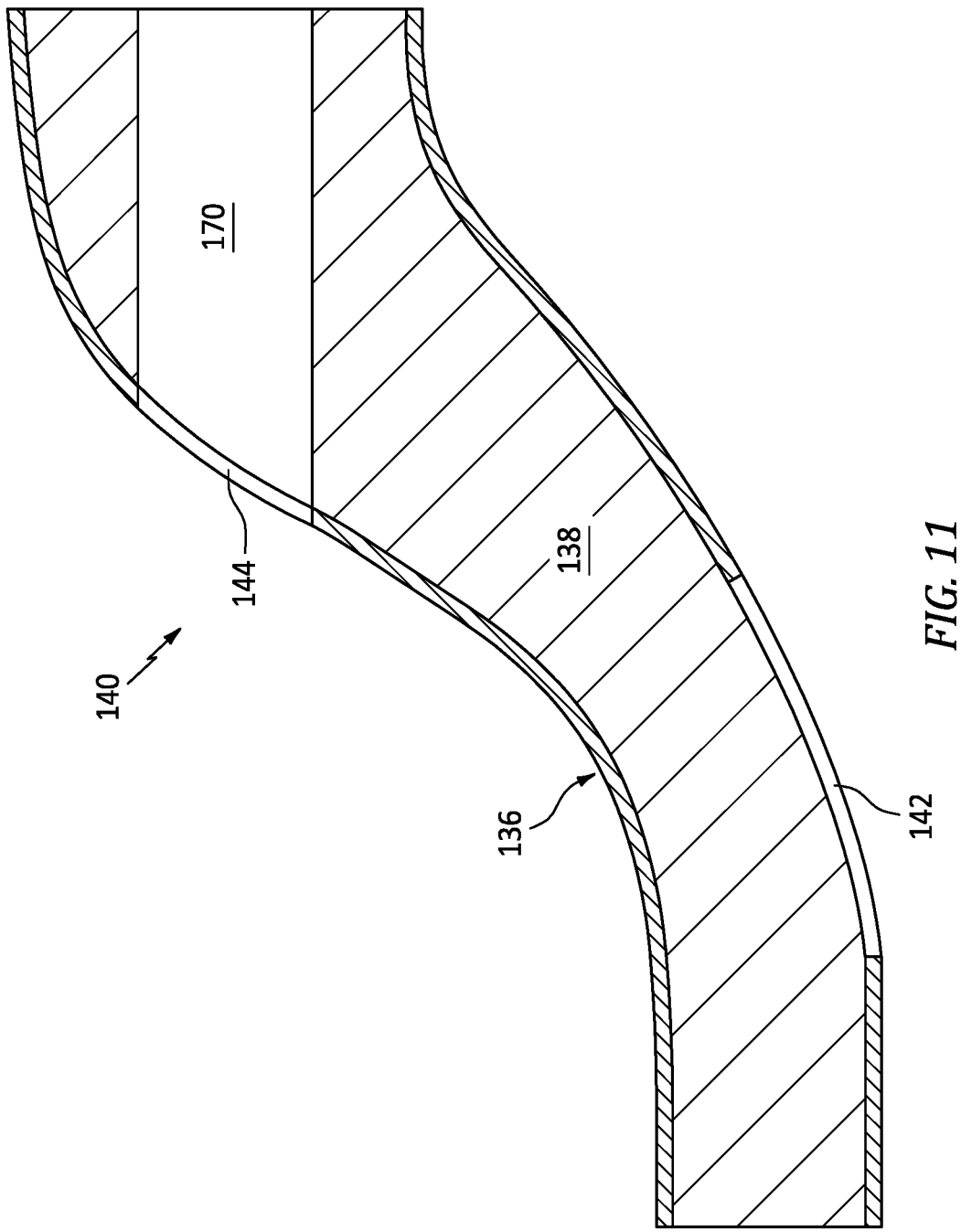
FIG. 11 is a sectional illustration of a base duct section overbraided mandrel.
Figure 12:
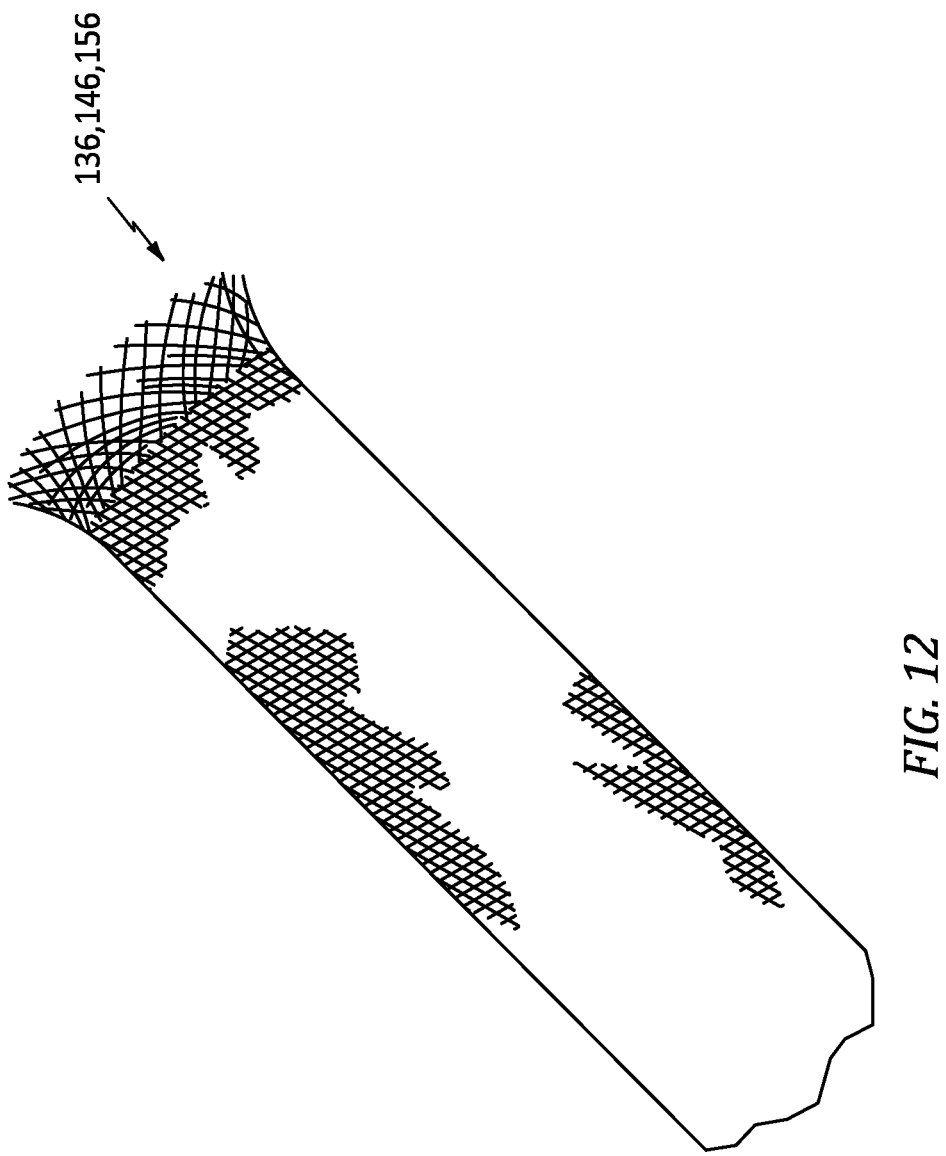
FIG. 12 is a perspective illustration of a portion of the woven fiber sleeve.

In step 1002, referring to FIG. 11, a base duct section woven fiber sleeve 136 is disposed over a base duct section mandrel 138 to provide a base duct section overbraided mandrel 140. Referring to FIG. 12, the base duct section woven fiber sleeve 136 may be configured as a circumferentially continuous tubular sleeve formed (e.g., woven) from the fiber reinforcement. The base duct section woven fiber sleeve 136 of FIG. 12, for example, is configured as a braided sleeve of the fiber reinforcement; e.g., carbon fiber braided sleeve, fiberglass braided sleeve, aramid fiber braided sleeve or the like. Various patterns may be used for weaving (e.g., braiding) the fiber reinforcement to form the base duct section woven fiber sleeve 136, and the present disclosure is not limited to any particular ones thereof.

Referring to FIG. 11, during the disposing step 1002, the base duct section woven fiber sleeve 136 may be slipped longitudinally onto an end of the base duct section mandrel 138. The base duct section mandrel 138 may thereby project longitudinally into an open end of the base duct section woven fiber sleeve 136. The base duct section woven fiber sleeve 136 may then be pulled along and (e.g., completely) onto the base duct section mandrel 138 such that, for example, an entire (or substantial) longitudinal length of the base duct section mandrel 138 is covered and overlapped by the base duct section woven fiber sleeve 136. In addition, one or more openings 142 and 144 may be formed through a side of the base duct section woven fiber sleeve 136. These openings 142 and 144 may correspond to the bypass opening 120 and the shaft opening 118. One or more of these openings 142 and 144 may be formed by manipulating (e.g., pulling apart) the fiber reinforcement of the base duct section woven fiber sleeve 136 and/or cutting the base duct section woven fiber sleeve 136.

Figure 13:
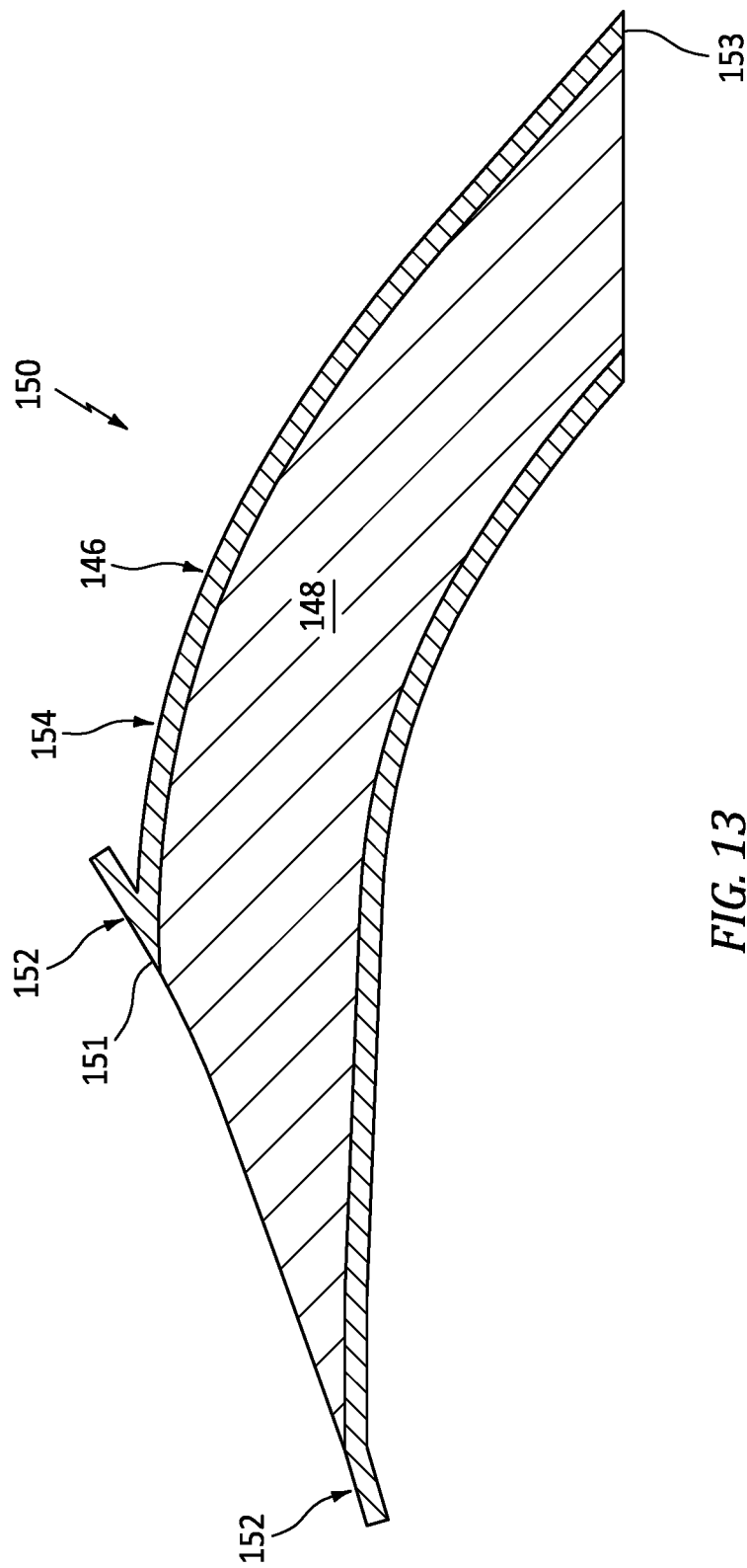
FIG. 13 is a sectional illustration of a bypass duct section overbraided mandrel.

In step 1004, referring to FIG. 13, a bypass duct section woven fiber sleeve 146 is disposed over a bypass duct section mandrel 148 to provide a bypass duct section overbraided mandrel 150. Referring to FIG. 12, the bypass duct section woven fiber sleeve 146 may be configured as a circumferentially continuous tubular sleeve formed (e.g., woven) from the fiber reinforcement. The bypass duct section woven fiber sleeve 146 of FIG. 12, for example, is configured as a braided sleeve of the fiber reinforcement; e.g., carbon fiber braided sleeve, fiberglass braided sleeve, aramid fiber braided sleeve or the like. Various patterns may be used for weaving (e.g., braiding) the fiber reinforcement to form the bypass duct section woven fiber sleeve 146, and the present disclosure is not limited to any particular ones thereof.

Referring to FIG. 13, during the disposing step 1004, the bypass duct section woven fiber sleeve 146 may be slipped longitudinally onto an end of the bypass duct section mandrel 148. The bypass duct section mandrel 148 may thereby project longitudinally into an open end of the bypass duct section woven fiber sleeve 146. The bypass duct section woven fiber sleeve 146 may then be pulled along and (e.g., completely) onto the bypass duct section mandrel 148 such that, for example, an entire (or substantial) longitudinal length of the bypass duct section mandrel 148 is covered and overlapped by the bypass duct section woven fiber sleeve 146.

At least one end portion of the bypass duct section woven fiber sleeve 146 is manipulated to provide the bypass duct section woven fiber sleeve 146 with an end mount section 152. This end portion of the bypass duct section woven fiber sleeve 146, for example, may be flared outward from a base section 154 of the bypass duct section woven fiber sleeve 146. More particularly, the fiber reinforcement at the end portion of the bypass duct section woven fiber sleeve 146 may be splayed or otherwise spread apart (e.g., without requiring cutting of the bypass duct section woven fiber sleeve 146) to respectively form the end mount section 152. This end mount section 152 projects out from and circumscribes the base section 154. Here, the base section 154 is wrapped circumferentially around the bypass duct section mandrel 148 and extends longitudinally along the bypass duct section mandrel 148 between and to opposing longitudinal overbraid ends 151 and 153 of, for example, the bypass duct section overbraided material.

Figure 14:
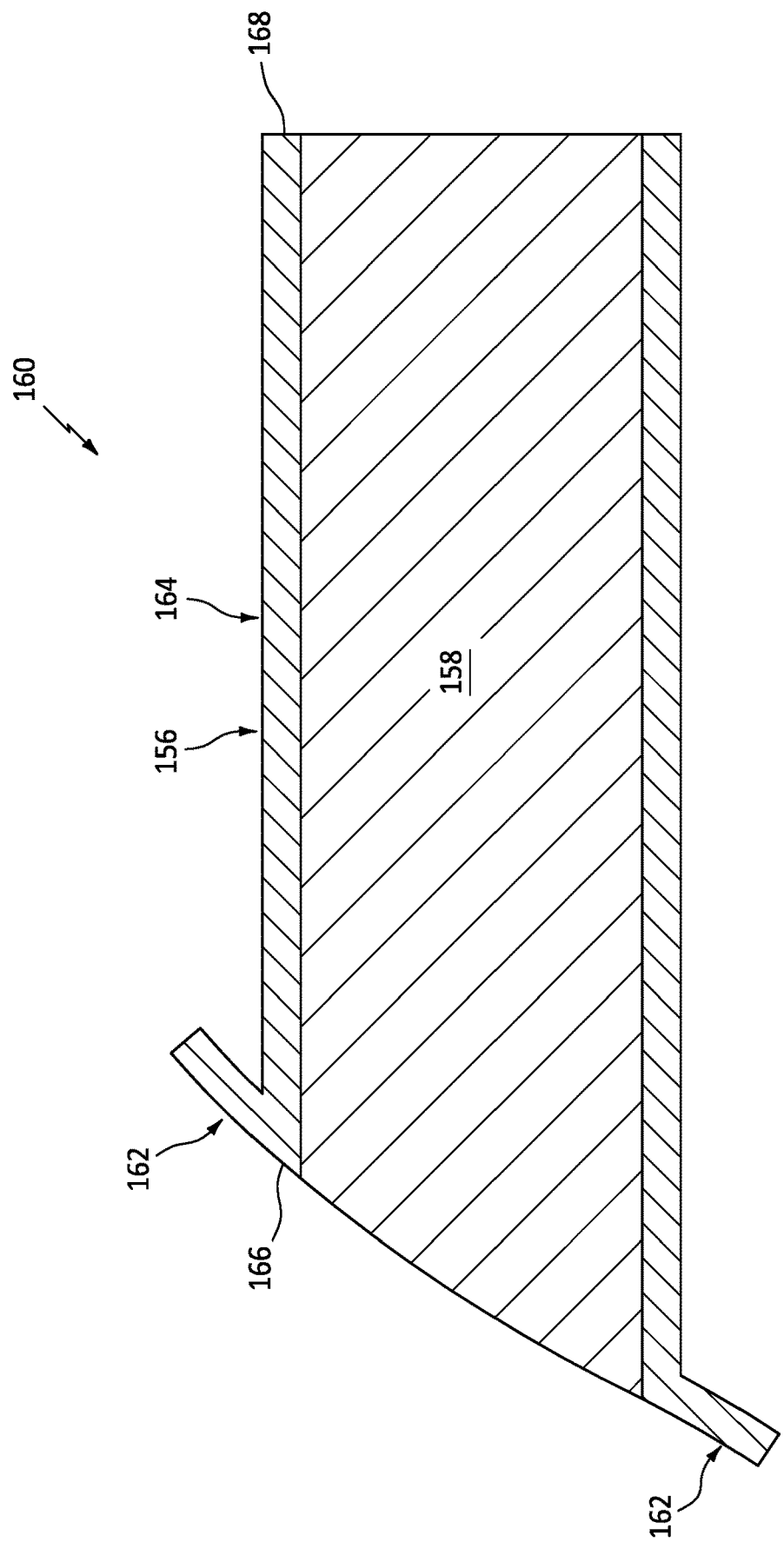
FIG. 14 is a sectional illustration of a shaft duct section overbraided mandrel.

In step 1006, referring to FIG. 14, a shaft duct section woven fiber sleeve 156 is disposed over a shaft duct section mandrel 158 to provide a shaft duct section overbraided mandrel 160. Referring to FIG. 12, the shaft duct section woven fiber sleeve 156 may be configured as a circumferentially continuous tubular sleeve formed (e.g., woven) from the fiber reinforcement. The shaft duct section woven fiber sleeve 156 of FIG. 12, for example, is configured as a braided sleeve of the fiber reinforcement; e.g., carbon fiber braided sleeve, fiberglass braided sleeve, aramid fiber braided sleeve or the like. Various patterns may be used for weaving (e.g., braiding) the fiber reinforcement to form the shaft duct section woven fiber sleeve 156, and the present disclosure is not limited to any particular ones thereof.

Referring to FIG. 14, during the disposing step 1006, the shaft duct section woven fiber sleeve 156 may be slipped longitudinally onto an end of the shaft duct section mandrel 158. The shaft duct section mandrel 158 may thereby project longitudinally into an open end of the shaft duct section woven fiber sleeve 156. The shaft duct section woven fiber sleeve 156 may then be pulled along and (e.g., completely) onto the shaft duct section mandrel 158 such that, for example, an entire (or substantial) longitudinal length of the shaft duct section mandrel 158 is covered and overlapped by the shaft duct section woven fiber sleeve 156.

At least one end portion of the shaft duct section woven fiber sleeve 156 is manipulated to provide the shaft duct section woven fiber sleeve 156 with an end mount section 162. This end portion of the shaft duct section woven fiber sleeve 156, for example, may be flared outward from a base section 164 of the shaft duct section woven fiber sleeve 156. More particularly, the fiber reinforcement at the end portion of the shaft duct section woven fiber sleeve 156 may be splayed or otherwise spread apart (e.g., without requiring cutting of the shaft duct section woven fiber sleeve 156) to respectively form the end mount section 162. This end mount section 162 projects out from and circumscribes the base section 164. Here, the base section 164 is wrapped circumferentially around the shaft duct section mandrel 158 and extends longitudinally along the shaft duct section mandrel 158 between and to opposing longitudinal overbraid ends 166 and 168 of, for example, the shaft duct section overbraided material.

Figure 15:
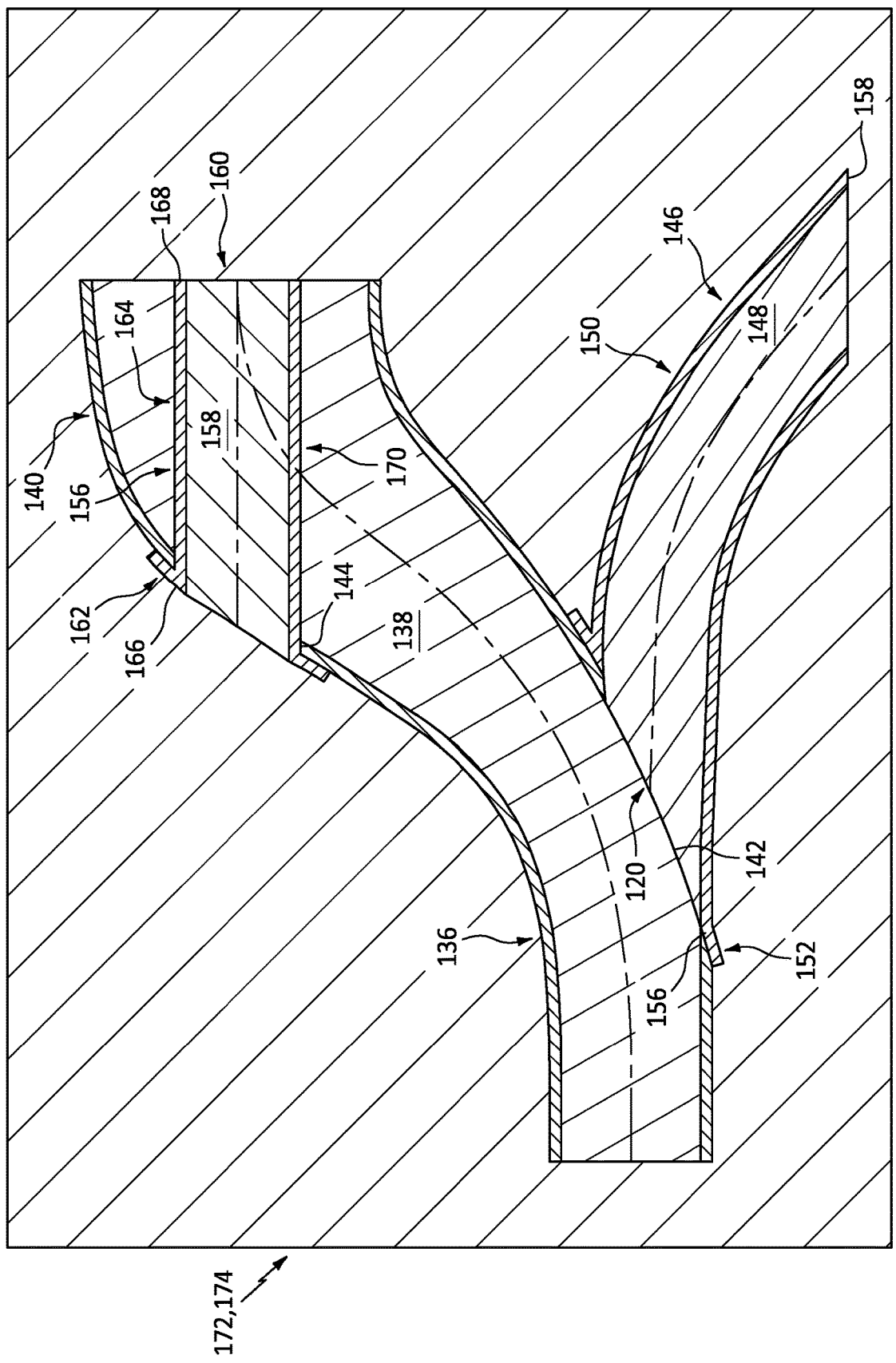
FIG. 15 is a sectional illustration of the overbraided mandrels with tooling.

In step 1008, referring to FIG. 15, the overbraided mandrels 140, 150 and 160 are arranged together. The bypass duct section overbraided mandrel 150, for example, is disposed next to a side of (and outside of) the base duct section overbraided mandrel 140. Here, the bypass duct section woven fiber sleeve 146 engages (e.g., contacts) the base duct section woven fiber sleeve 136. The overbraid first end 156 and the end mount section 152 are disposed at and extend circumferentially about the bypass opening 120.

The shaft duct section overbraided mandrel 160 is inserted through the opening 144 and into an aperture 170 (see also FIG. 11) in the base duct section mandrel 138. Here, the base section 164 of the shaft duct section woven fiber sleeve 156 is disposed substantially within the aperture 170. The shaft duct section woven fiber sleeve 156 engages (e.g., contacts) the base duct section woven fiber sleeve 136. The overbraid first end 166 and the end mount section 162 are disposed at the opening 144; e.g., outside of the base duct section overbraided mandrel 140.

In step 1010, the arrangement of overbraided mandrels 140, 150 and 160 are arranged with tooling 172. This tooling 172 may be configured as or otherwise include an exterior mold 174. Here, the overbraided mandrels 140, 150 and 160 may be disposed within an internal cavity of the exterior mold 174. The exterior mold 174 may thereby substantially or completely overlap and circumscribe an exterior of the overbraided material. To facilitate arrangement of the overbraided mandrels 140, 150 and 160 into the internal cavity, the exterior mold 174 may have a segmented body. The exterior mold 174, for example, may be formed from two separable halves.

In step 1012, the polymer material is disposed with the woven fiber sleeves 136, 146 and 156 to provide the duct structure 60. The polymer material, for example, may be infused into the fiber reinforcement of the woven fiber sleeves 136, 146 and 156, for example, following (or during or before) the step 1010. Liquid polymer material, for example, may be injected into the exterior mold 174 until the fiber reinforcement of the woven fiber sleeves 136, 146 and 156 are embedded within a matrix of the polymer material. Where the polymer material is the thermoset, the polymer material may be cured under an elevated temperature and/or pressure between the molding members 138, 148, 158 and 174. Where the polymer is the thermoplastic, the polymer material may be set (e.g., solidified) under pressure between the molding members 138, 148, 158 and 174. Following this formation of the duct structure 60, the molding members 138, 148, 158 and 174 are removed to liberate the formed duct structure 60.

In some embodiments, any one or more or all of the mandrels 138, 148 and 158 may each be formed from a relatively compliant material to facilitate removal. Each mandrel 138, 148, 158, for example, may be constructed from or otherwise include thermoplastic or low melt metallic material. Each mandrel 138, 148, 158 may alternatively be constructed from a washout sand, where the washout sand may be removed by a dissolvable material. Of course, various other techniques may also or alternatively be employed to facilitate removal of the mandrels 138, 148 and 158 from an interior of the duct structure 60.

In some embodiments, referring to FIG. 4, one or more or all of the duct sections 74, 94 and 108 may each be formed from a single woven fiber sleeve. In other embodiments, one or more or all of the duct sections 74, 94 and 108 may also or alternatively each be formed from multiple woven fiber sleeves; e.g., where one woven fiber sleeve is disposed over another woven fiber sleeve.

In some embodiments, referring to FIG. 3, the duct structure 60 may include one or more electric heating elements 176; e.g., carbon nano-tube heaters. These electric heating elements 176 may be woven into a respective woven fiber sleeve, or placed between an overlapping set (e.g., stack) of the woven fiber sleeves. These electric heating elements 176 may be arranged at various locations along the duct structure 60; e.g., at and/or about the nose lip 58, at and/or about a splitter 178 between the engine duct 65 and the bypass duct 66 (see also FIG. 4).

Figure 16:
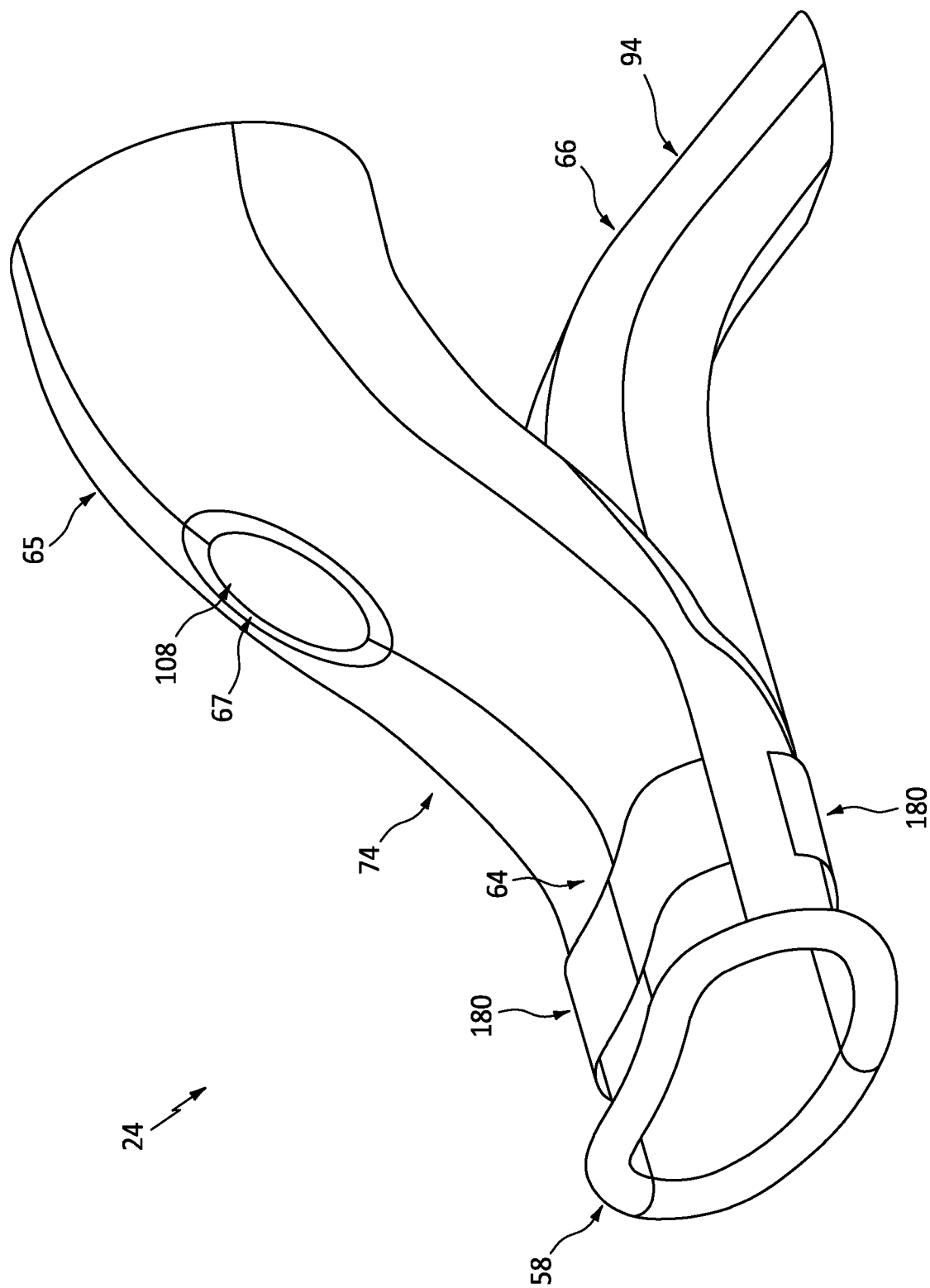
FIG. 16 is a perspective illustration of the duct assembly with one or more acoustic structures.
Figure 17:
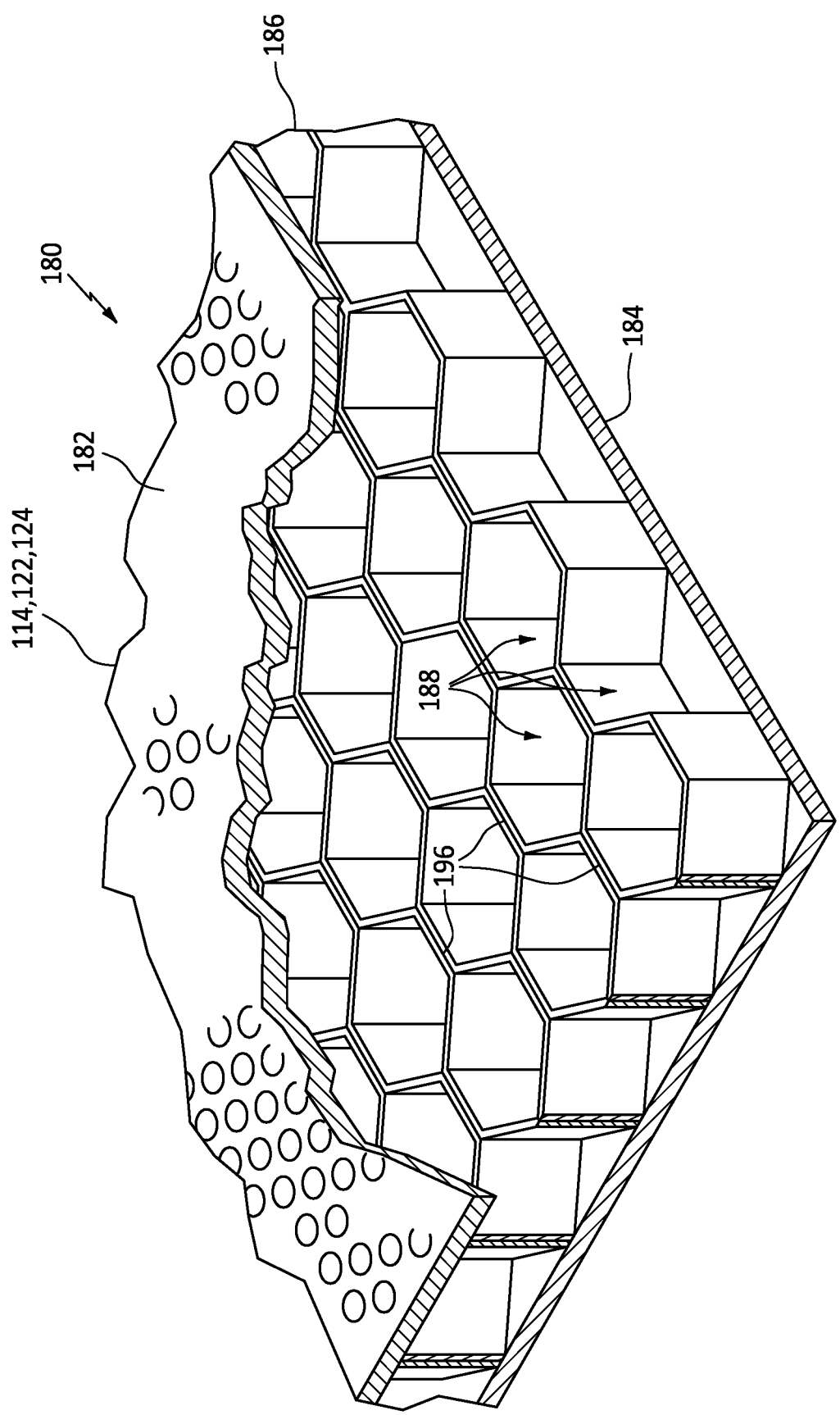
FIG. 17 is a partial cutaway illustration of one of the acoustic structures.

In some embodiments, referring to FIG. 16, the duct structure 60 may also include one or more acoustic structures 180; e.g., acoustic panels. Referring to FIG. 17, each acoustic structure 180 includes a perforated face skin 182, a (e.g., non-perforated) back skin 184 and a cellular core 186; e.g., a honeycomb or other porous core. The face skin 182 may be formed from a perforated portion of the sidewall 114, 122, 124, 128 of the duct structure 60; e.g., a perforated portion of the sidewall 124 of the inlet duct 64. The cellular core 186 is arranged (e.g., radially) between and is connected (e.g., bonded) to the face skin 182 and the back skin 184. This acoustic structure 180 may be formed onto the inlet duct 64 (and/or another portion of the duct structure 60) after the respective duct is formed. Alternatively, the back skin 184 and the cellular core 186 may be laid up with the woven fiber sleeve and co-cured to form the acoustic structure 180 with the respective duct in the monolithic body. The present disclosure, however, is not limited to any particular acoustic structure formation techniques. The present disclosure is also not limited to any particular cellular core type or configuration.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for manufacturing, comprising:
disposing a first woven fiber sleeve over a first mandrel to provide a first overbraided mandrel, the first woven fiber sleeve wrapped circumferentially around the first mandrel, the first woven fiber sleeve extending longitudinally along the first mandrel between a first overbraid first end and a first overbraid second end, and an opening formed through a side of the first woven fiber sleeve longitudinally between the first overbraid first end and the first overbraid second end;
disposing a second woven fiber sleeve over a second mandrel to provide a second overbraided mandrel, the second woven fiber sleeve wrapped circumferentially around the second mandrel, and the second woven fiber sleeve extending longitudinally along the second mandrel between a second overbraid first end and a second overbraid second end;
arranging the second overbraided mandrel with the first overbraided mandrel, the second woven fiber sleeve engaging the side of the first woven fiber sleeve, and the second overbraid first end disposed at and extending circumferentially around the opening;
disposing a polymer material with the first woven fiber sleeve and the second woven fiber sleeve to provide a duct structure; and
providing an acoustic structure for the duct structure, the acoustic structure including a perforated face skin, a back skin and a cellular core between and connected to the perforated face skin and the back skin, and the perforated face skin including a portion of the first woven fiber sleeve.

2. The method of claim 1, wherein
the duct structure includes an inlet, a first outlet and a second outlet; and
the duct structure fluidly couples and branches out from the inlet to the first outlet and the second outlet.

3. The method of claim 2, wherein
the first woven fiber sleeve forms the inlet at the first overbraid first end;
the first woven fiber sleeve forms the first outlet at the first overbraid second end; and
the second woven fiber sleeve forms the second outlet at the second overbraid second end.

4. The method of claim 1, wherein
the second woven fiber sleeve of the second overbraided mandrel includes a base section and a mount section;
the base section is wrapped circumferentially around the second mandrel, and the base section extends longitudinally along the second mandrel between the second overbraid first end and the second overbraid second end; and
the mount section is disposed at the second overbraid first end and projects out from the base section.

5. The method of claim 4, wherein the mount section is abutted against the side of the first woven fiber sleeve during the arranging of the second overbraided mandrel.

6. The method of claim 4, wherein the mount section forms an annular flange around the opening.

7. The method of claim 1, further comprising:
disposing a third woven fiber sleeve over a third mandrel to provide a third overbraided mandrel, the third woven fiber sleeve wrapped circumferentially around the third mandrel, and the third woven fiber sleeve extending longitudinally along the third mandrel between a third overbraid first end and a third overbraid second end; and
arranging the third overbraided mandrel with the first overbraided mandrel, the third woven fiber sleeve engaging the side of the first woven fiber sleeve, and the third overbraid first end disposed at a second opening in the side of the first woven fiber sleeve longitudinally between the first overbraid first end and the first overbraid second end;
the disposing of the polymer material further comprising disposing the polymer material with the third woven fiber sleeve to provide the duct structure.

8. The method of claim 7, wherein
the third woven fiber sleeve of the third overbraided mandrel includes a base section and a mount section;
the base section is wrapped circumferentially around the third mandrel, and the base section extends longitudinally along the third mandrel between the third overbraid first end and the third overbraid second end;
the mount section is disposed at the third overbraid first end and projects out from the base section.

9. The method of claim 8, wherein the mount section is abutted against the side of the first woven fiber sleeve during the arranging of the third overbraided mandrel.

10. The method of claim 8, wherein the mount section forms an annular flange around the second opening.

11. The method of claim 1, further comprising:
arranging one or more electric heating elements with at least one of the first woven fiber sleeve or the second woven fiber sleeve;
the one or more electric heating elements configured for an anti-icing system for the duct structure.

12. The method of claim 1, wherein the polymer material comprises thermoset material.

13. The method of claim 1, wherein the disposing of the polymer material comprises
infusing the polymer material into the first woven fiber sleeve and the second woven fiber sleeve; and
curing the polymer material to provide the duct structure.

14. The method of claim 1, wherein the duct structure is configured for an aircraft propulsion system.

15. A method for manufacturing, comprising:
disposing a first woven fiber sleeve over a first mandrel to provide a first overbraided mandrel, the first woven fiber sleeve wrapped circumferentially around the first mandrel, the first woven fiber sleeve extending longitudinally along the first mandrel between a first overbraid first end and a first overbraid second end, and an opening formed through a side of the first woven fiber sleeve longitudinally between the first overbraid first end and the first overbraid second end;
disposing a second woven fiber sleeve over a second mandrel to provide a second overbraided mandrel, the second woven fiber sleeve wrapped circumferentially around the second mandrel, and the second woven fiber sleeve extending longitudinally along the second mandrel between a second overbraid first end and a second overbraid second end;
arranging the second overbraided mandrel with the first overbraided mandrel, the second woven fiber sleeve engaging the side of the first woven fiber sleeve, and the second overbraid first end disposed at and extending circumferentially around the opening;
disposing a third woven fiber sleeve over a third mandrel to provide a third overbraided mandrel, the third woven fiber sleeve wrapped circumferentially around the third mandrel, and the third woven fiber sleeve extending longitudinally along the third mandrel between a third overbraid first end and a third overbraid second end;

arranging the third overbraided mandrel with the first overbraided mandrel, the third woven fiber sleeve engaging the side of the first woven fiber sleeve, and the third overbraid first end disposed at a second opening in the side of the first woven fiber sleeve longitudinally between the first overbraid first end and the first overbraid second end; and disposing a polymer material with the first woven fiber sleeve and the second woven fiber sleeve to provide a duct structure, and the disposing of the polymer material further comprising disposing the polymer material with the third woven fiber sleeve to provide the duct structure;

wherein the arranging of the third overbraided mandrel comprises inserting the third overbraided mandrel through the second opening and into an aperture in the first mandrel.

16. A method for manufacturing, comprising:

disposing a first woven fiber sleeve over a first mandrel to provide a first overbraided mandrel, the first woven fiber sleeve wrapped circumferentially around the first mandrel, the first woven fiber sleeve extending longitudinally along the first mandrel between a first overbraid first end and a first overbraid second end, and an opening formed through a side of the first woven fiber sleeve longitudinally between the first overbraid first end and the first overbraid second end;

disposing a second woven fiber sleeve over a second mandrel to provide a second overbraided mandrel, the second woven fiber sleeve wrapped circumferentially around the second mandrel, and the second woven fiber sleeve extending longitudinally along the second mandrel between a second overbraid first end and a second overbraid second end;

inserting the second overbraided mandrel through the opening and into an aperture in the first mandrel, the second woven fiber sleeve engaging the side of the first woven fiber sleeve, and the second overbraid first end disposed at the opening; and disposing a polymer material with the first woven fiber sleeve and the second woven fiber sleeve to provide a duct structure.

* * * * *